US012803808B2

(12) United States Patent
Baek et al.

(10) Patent No.: US 12,803,808 B2
(45) Date of Patent: Nov. 17, 2026

(54) METHOD AND SYSTEM FOR AUDITING FORGERY USING A PLURALITY OF AUDIT COMMITTEES HAVING DIFFERENT PROOF ALGORITHM

(71) Applicant: LEADPOINT SYSTEM INC., Jeonju (KR)

(72) Inventors: Eun Ju Baek, Namyangju (KR); Do Hyoung Kim, Namyangju (KR)

(73) Assignee: LEADPOINT SYSTEM INC., Jeonju (KR)

( * ) Notice: Subject to any disclaimer, the term of this patent is extended or adjusted under 35 U.S.C. 154(b) by 58 days.

(21) Appl. No.: 18/973,375

(22) Filed: Dec. 9, 2024

(65) Prior Publication Data

US 2025/0193012 A1 Jun. 12, 2025

(30) Foreign Application Priority Data

Dec. 11, 2023 (KR) ........................ 10-2023-0178271

(51) Int. Cl.

*H04L 9/32* (2006.01)
*G06F 21/64* (2013.01)
*H04L 9/00* (2022.01)

(52) U.S. Cl.

CPC ............ *H04L 9/3218* (2013.01); *G06F 21/64* (2013.01); *H04L 9/50* (2022.05)

(58) Field of Classification Search

CPC .......... H04L 9/3218; H04L 9/50; G06F 21/64
USPC .......................................................... 713/189
See application file for complete search history.

(56) References Cited

U.S. PATENT DOCUMENTS

| | | | | |
|---|---|---|---|---|
| 11,171,783 | B2 * | 11/2021 | Doddavula | H04L 9/50 |
| 2021/0192520 | A1 * | 6/2021 | Patel | G06Q 20/02 |
| 2022/0231834 | A1 * | 7/2022 | Das | H04L 63/123 |
| 2023/0208640 | A1 * | 6/2023 | El Khiyaoui | H04L 9/3247 713/168 |
| 2025/0190539 | A1 * | 6/2025 | Baek | G06F 21/50 |
| 2025/0193012 | A1 * | 6/2025 | Baek | H04L 9/3218 |
| 2025/0293879 | A1 * | 9/2025 | Gilchrist | G06F 3/0655 |
| 2025/0356058 | A1 * | 11/2025 | D'Annunzio | G06F 21/64 |

FOREIGN PATENT DOCUMENTS

| | | | |
|---|---|---|---|
| KR | 10-2268700 | B1 | 6/2019 |
| KR | 10-2020-0110832 | A | 9/2020 |
| KR | 10-2020-0124429 | A | 11/2020 |
| KR | 10-2021-0046187 | A | 4/2021 |
| KR | 10-2023-0071790 | A | 5/2023 |

OTHER PUBLICATIONS

Office Action From Korean Patent Office, Oct. 22, 2025.

* cited by examiner

*Primary Examiner* — Dant B Shaifer Harriman
(74) *Attorney, Agent, or Firm* — Harvest IP Law, LLP

(57) ABSTRACT

Proposed are a method and a system for auditing for forgery, capable of auditing for forgery of ledger information with high reliability by using a plurality of audit committees having different proof algorithms. The method includes clustering a plurality of ledger information from a plurality of node devices in a blockchain network for electronic notarization, verifying the forgery of the plurality of ledger information by an audit network by identifying a discrepancy between the plurality of ledger information and responding to the discrepancy, and generating a block for updating ledger information of the plurality of node devices on the basis of the verification results.

13 Claims, 17 Drawing Sheets

METHOD AND SYSTEM FOR AUDITING FORGERY USING A PLURALITY OF AUDIT COMMITTEES HAVING DIFFERENT PROOF ALGORITHM

CROSS REFERENCE TO RELATED APPLICATION

The present application claims priority to Korean Patent Application No. 10-2023-0178271, filed Dec. 11, 2023, the entire contents of which are incorporated herein for all purposes by this reference.

BACKGROUND OF THE INVENTION

Field of the Invention

The present disclosure relates to a method and a system for auditing for forgery of a blockchain network. More particularly, the present disclosure relates to a method and a system for auditing for forgery, capable of auditing for forgery of ledger information with high reliability by using a plurality of audit committees having different proof algorithms.

Description of the Related Art

A blockchain, which is one type of distributed database, uses a peer-to-peer (P2P) network. A distributed database is a technology that makes many users share a large-scale database by physically distributing data. A blockchain is a structure list and network participant node devices can store data and collectively record and manage master data recording transaction information through verification.

When a new block is created in a blockchain network, the block verified through a consensus algorithm of a plurality of participants (node devices) can be connected to the existing block, and be stored in a distributed manner after being confirmed as the final ledger including transaction history. In addition, when a transaction occurs on a participation node device, transaction information verified through the effectiveness verification with respect to the corresponding transaction is transmitted to each node device. Through this, transaction history, that is, verified transactions, are transmitted to be stored in a distributed manner and it is possible to identify the forgery on the basis of the distributedly stored transactions when data of some nodes is forged. The security stability of blockchain increases as more users share data. In addition to virtual currencies such as Bitcoin, blockchain is being utilized in various online services such as cloud computing services.

Meanwhile, attempts to more clearly prove the integrity of notarization documents are being made by applying blockchain technology to electronic notarization systems. For example, when storing the original or a hash value of notarization documents on the blockchain, it is safer from hacking than existing computer systems, thereby adding the reliability to the process of creating, managing, and distributing notarization documents.

SUMMARY OF THE INVENTION

A technical task to be solved through the exemplary embodiments of the present disclosure is to provide a method and a system for auditing for forgery by using a plurality of audit committees, which further improve reliability and safety, by auditing for forgery and restoring the originality of ledger information by using a plurality of audit committees having different proof algorithms while auditing whether the ledger information stored in a blockchain network is forged.

Another technical task to be solved through the exemplary embodiments of the present disclosure is to provide a method and a system, which more reliably ensures the integrity of data stored in a blockchain by checking whether ledger information is forged by using an audit node and which allows blockchain technology to be used for public ledgers that require high data stability and reliability.

Another technical task to be solved through the exemplary embodiments of the present disclosure is to provide a method and a system, which can ensure the integrity of blockchain network data by auditing ledger information in a random consensus proof-based blockchain network through an audit node operating with a plurality of consensus algorithms while allowing a non-random consensus proof-based blockchain network to be utilized as a random consensus proof-based blockchain network.

The technical tasks of the present disclosure are not limited to the technical tasks mentioned above, and other technical tasks not mentioned will be clearly understood by those skilled in the art from the following description.

According to an exemplary embodiment of the present disclosure for solving the above-mentioned problems, a method is provided for auditing for forgery by using a plurality of audit committees, the method comprising: clustering a plurality of ledger information from a plurality of node devices in a blockchain network for electronic notarization, verifying forgery of the plurality of ledger information by an audit network by identifying a discrepancy between the plurality of ledger information, and generating a block for updating ledger information of the plurality of node devices on the basis of a result of verifying the forgery of the plurality of ledger information, wherein the blockchain network generates a block to be distributed in the blockchain network through a neural consensus proof-based block generation process, and the audit network comprises a plurality of audit committees having different proof methods, and verifies the forgery of the plurality of ledger information by voting on the basis of a proof result of the plurality of audit committees.

According to another exemplary embodiment of the present disclosure for solving the above-mentioned problems, a system is provided for auditing for forgery by using a plurality of audit committees, the system comprising: a blockchain network for electronic notarization including a plurality of node devices performing a neural consensus proof-based block generation process according to a preset condition, and an audit network identifying a discrepancy between a plurality of ledger information clustered from the plurality of node devices, verifying forgery of the plurality of ledger information on the basis of a result of identifying the discrepancy, and replying with a first ledger information, whose integrity is verified, to the blockchain network, wherein the blockchain network generates a block for updating ledger information of the plurality of node devices on the basis of the first ledger information, and the audit network comprises a plurality of audit committees having different proof methods and verifies forgery of the plurality of ledger information by voting on the basis of a proof result of the plurality of audit committees.

According to the exemplary embodiments of the present disclosure, it is possible to further improve the reliability and safety of auditing for forgery by using a plurality of audit committees having different proof algorithms while auditing whether ledger information stored in a blockchain network is forged.

In addition, it is possible to more reliably ensure the integrity of data stored in a blockchain by checking whether ledger information is forged by using an audit node and to allow blockchain technology to be used for public ledgers that require high data stability and reliability.

In addition, it is possible to provide an efficient and fair neural consensus proof-based distributed consensus process while preventing waste of resources and social costs, by converting to be utilized as a random consensus proof-based blockchain network while maintaining the infrastructure and utility of the pre-established non-random consensus proof-based blockchain network as much as possible.

The beneficial effects of the present disclosure are not limited to the mentioned above, and other beneficial effects not mentioned will be clearly understood by those skilled in the art from the following description.

BRIEF DESCRIPTION OF THE DRAWINGS

The above and other objectives, features and other advantages of the present disclosure will be more clearly understood from the following detailed description when taken in conjunction with the accompanying drawings.

DETAILED DESCRIPTION OF THE INVENTION

The following provides only the principle of the present disclosure. Accordingly, those skilled in the art may implement the principle of the present disclosure and various apparatuses included in the concept and range of the present disclosure which are not clearly described or shown herein though. All conditional terminologies and embodiments described herein should be understood as being definitely intended as an object for understanding the concept of the present disclosure without limiting the specifically stated embodiments and states.

Further, all detailed descriptions enumerate not only the principle, aspects, and embodiments of the present disclosure, but specific embodiments should be understood as being intended to include structural and functional equivalents of those matters. Further, these equivalents should be understood as including all elements designed to perform the same functions regardless of not only equivalents known at present, but equivalents, that is, structures to be developed in the future.

Accordingly, for example, block diagrams of this specification should be understood as showing an exemplary conceptual respect that concretes the principle of the present disclosure. Similarly, all of flowcharts, state conversion diagrams, intention codes, etc. should be understood as showing various processes that can be substantially shown on computer-readable media and are performed by computers and processors regardless of whether a computer or a processor is definitely shown.

Further, definite use of terms proposed as a processor, control, or similar concepts should not be construed by exclusively citing hardware having ability to execute software and should be construed as suggestively including digital signal processor (DSP) hardware, and a ROM, a RAM, and a nonvolatile memory for storing software without limitation. Other well-known and generally used hardware may also be included.

The objectives, features, and advantages of the present disclosure described above will be clearer through the following detailed description relating to the accompanying drawing, so the spirit of the present disclosure would be easily implemented by those skilled in the art. Further, in description of the present disclosure, well-known technologies are not described in detail not to unnecessarily obscure the subject of the present disclosure.

In the present disclosure, the term “integrity” can be understood to have the same meaning as “originality,” and “integrity” and “originality” may be used interchangeably with the same meaning.

Hereinafter, exemplary embodiments of the present disclosure will be described in detail with reference to the accompanying drawings.

Figure 1:
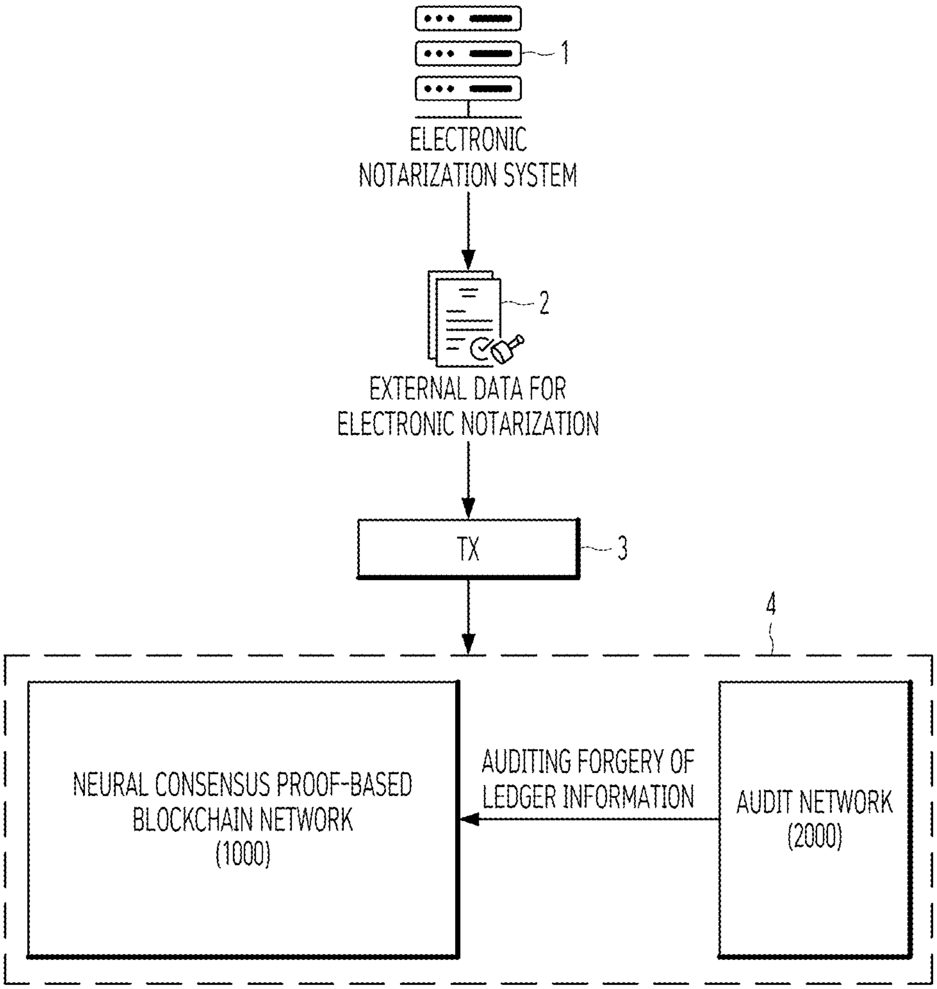
FIG. 1 is a diagram schematically showing an entire system according to an exemplary embodiment of the present disclosure.

FIG. 1 is a diagram schematically showing an entire system according to an exemplary embodiment of the present disclosure. Referring to FIG. 1, external data 2 for electronic notarization outputted through the electronic notarization system 1 may be carried in a transaction 3 (or transaction data) and stored in a neural consensus proof-based blockchain network 1000 included in a system 4 for auditing forgery of ledger information. The neural consensus proof-based blockchain network 1000 may be composed of a plurality of node devices, and the plurality of node devices may compose a neural consensus proof module cluster, thereby verifying the integrity of the ledger information of each node device through a consensus algorithm.

Accordingly, even when the ledger information of some node devices is damaged for hacking or other reasons, the integrity of the data stored in the blockchain network 1000 can be guaranteed because the same content as the original is immediately restored by the consensus algorithm of the neural consensus proof module cluster.

Although the blockchain network 1000 has a consensus algorithm capable of restoring the originality (or integrity), the damaged original may not be restored by itself in some extreme situations. For example, when a 51% of the attack on the blockchain network 1000 is successful and incorrect ledger information is considered to be the original, it may be difficult for the blockchain network 1000 to restore the damaged original by itself.

To remedy this problem, the system 4 for auditing the forgery of ledger information may audit the forgery of ledger information of node devices in the blockchain network 1000 through the audit network when it is determined that the originality of the blockchain network 1000 is damaged, and may provide the correct ledger information stored in the audit network 2000 to the blockchain network 1000, thereby restoring the originality of the ledger information of each node device in the blockchain network 1000.

Hereinafter, a detailed configuration and operation method of the neural consensus proof-based blockchain network 1000 and the audit network 2000 for auditing the forgery of ledger information will be described with specific exemplary embodiments.

Figure 2:
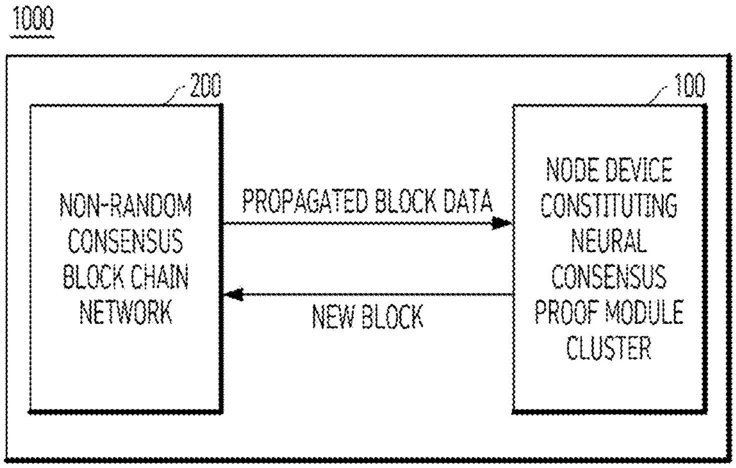
FIG. 2 is a diagram for explaining a blockchain network according to an embodiment of the present disclosure.

FIG. 2 is a diagram for explaining a blockchain network 1000 according to an embodiment of the present disclosure.

A blockchain network 1000 according to an embodiment of the present disclosure may be a mesh-topology blockchain network configured by one or more node devices connected through a wired or wireless network. The node devices are connected to the blockchain network through I/O devices and can exchange data. The blockchain network system 1000 may include, as the node devices, various electronic systems such as mobile devices including a mobile phone, a smartphone, a PDA, a tablet computer, a laptop, etc., computing devices including a personal computer, a tablet computer, a netbook, etc., or electronic products including a television, a smart television, a security device for gate control, etc.

Further, each of the node devices 100 may have a communication module for connecting to the blockchain network. The blockchain network, for example, may be implemented as a wired network such as a Local Area Network (LAN), a Wide Area Network (WAN), or a Value Added Network (VAN). Further, the blockchain network may be implemented as all kinds of wireless networks such as a mobile radio communication network, a satellite communication network, Bluetooth, Wireless Broadband Internet (Wibro), High Speed Downlink Packet Access (HSDPA), Wi-Fi, Long Term Evolution (LTE). Depending on necessity, the blockchain network may be a wired-wireless mixed network.

Further, each of the node devices can register account information according to its node connection in transaction ledger data that are shared in a cloud manner through a network. Further, when there is a need for a transaction of encryption information for creating a blockchain, each trader terminal can propagate transaction information to be recorded in the transaction ledger data to every trader terminal.

Further, the transaction ledger data are updated and the information thereof is shared in accordance with mutual verification processing corresponding to the above process, whereby a transaction of encryption information for creating a blockchain can be made.

In this case, the transaction ledger data can be linked with a blockchain data having a structure in which a plurality of blocks is sequentially connected in order of creation by making each of blocks corresponding to predetermined times or units include a hash value for a block created before a current block. Accordingly, it is possible to easily verify whether the transaction ledger data have been tampered by verifying the hash values of the blockchain.

Security stability of the blockchain can be implemented by participation in the system of sharers who share data. Accordingly, transaction information blocks, which include specifications of sharing between sharer terminals connected to the blockchain network, specifications of issuance/transaction of encryption information for creating the blockchain, etc., can be sequentially stored, and transaction verification processing for sequentially making hash values for anti-tempering thereof into a blockchain can be distributionally performed at the trader terminals.

A non-random consensus blockchain network 200 may refer to a non-random proof-based blockchain network, such as a Proof-of-Work (PoW) or Proof-of-Stake (PoS) blockchain network. For example, the non-random consensus blockchain network 200 may be the Bitcoin or Ethereum network.

The node devices 100 according to an embodiment of the present disclosure can constitute a neural consensus proof module cluster, and the neural consensus proof module cluster can configure a new block combined with neural consensus validation data on the basis of random consensus proof manner and can process the configured new block to be propagated through the non-random consensus blockchain network 200.

Accordingly, in the non-random consensus blockchain network 200, the propagated block data are shared again in the network and can be processed such that a next block is created again by the node device 100 configuring the neural consensus proof module cluster. Since specific proof such as PoW and PoW is not required in this process, it is possible to construct a new random consensus blockchain network system 1000 that can implement decentralization in a non-competitive manner.

That is, according to an embodiment of the present disclosure, since the neural consensus proof module cluster that enables the existing non-random consensus proof-based blockchain network 200 to be used as the random consensus proof-based blockchain network 1000 is constructed using the node device 100, it is possible to provide the node device 100 forming a network that enables a random consensus proof-based blockchain network based on a pre-constructed blockchain network to be operated while controlling an existing pre-constructed PoW-type or PoS-type blockchain network not to be operated anymore in the PoW or PoS manner or to be limitatively operated in accordance with the minimum number of nodes of a Byzantine fault tolerance consensus.

Accordingly, it is possible to convert the pre-constructed non-random consensus proof-based blockchain network to be used as a random consensus proof-based blockchain network while maximally maintaining the infrastructure and usefulness of the pre-constructed non-random consensus proof-based blockchain network, so it is possible to provide a neural consensus proof-based distributed consensus process that prevents a waste of resources and social costs and is efficient and fair. In this case, a nonce chain and hash checking process configured on the basis of one-time random numbers may be used for participation qualification proof for a random consensus, but this is only an example designation and participation qualification proof of a random consensus can be possible even in various other manners.

Figure 3:
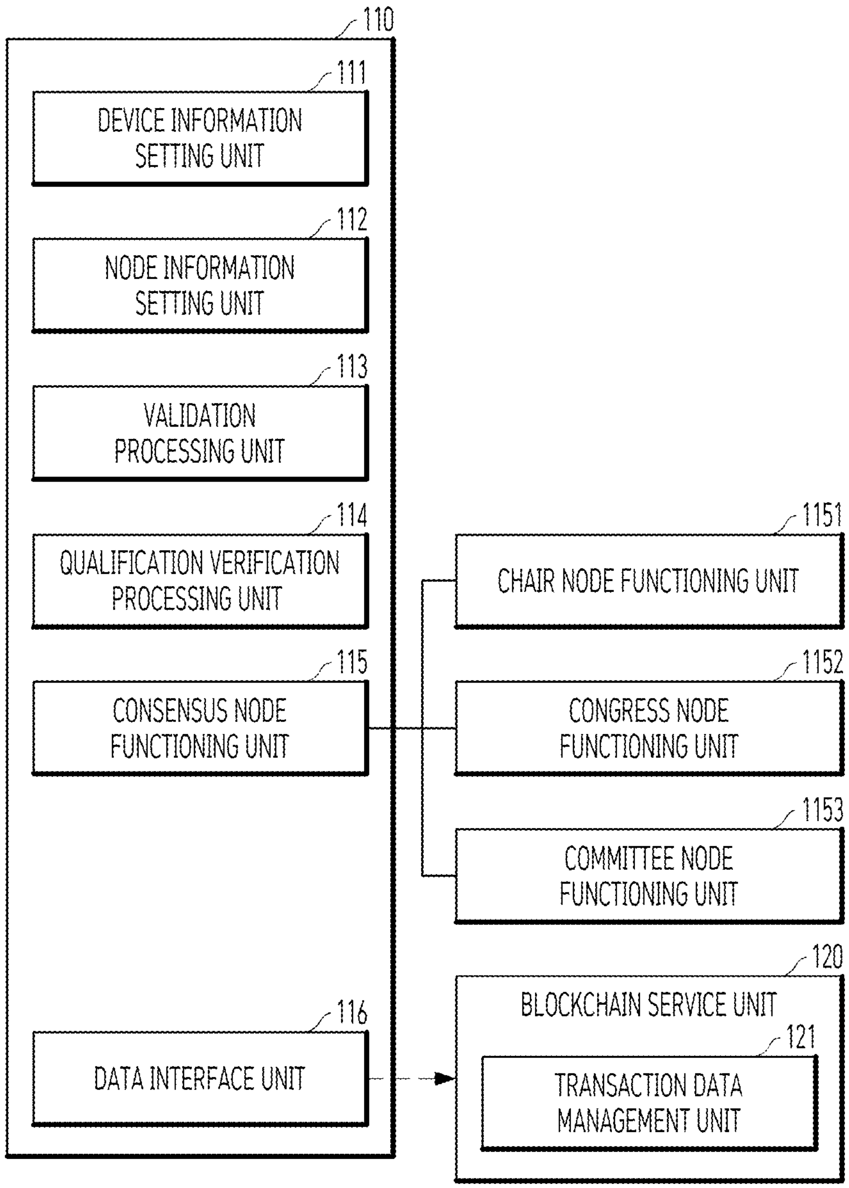
FIG. 3 is a block diagram showing in more detail a node device according to an embodiment of the present disclosure.
Figure 4:
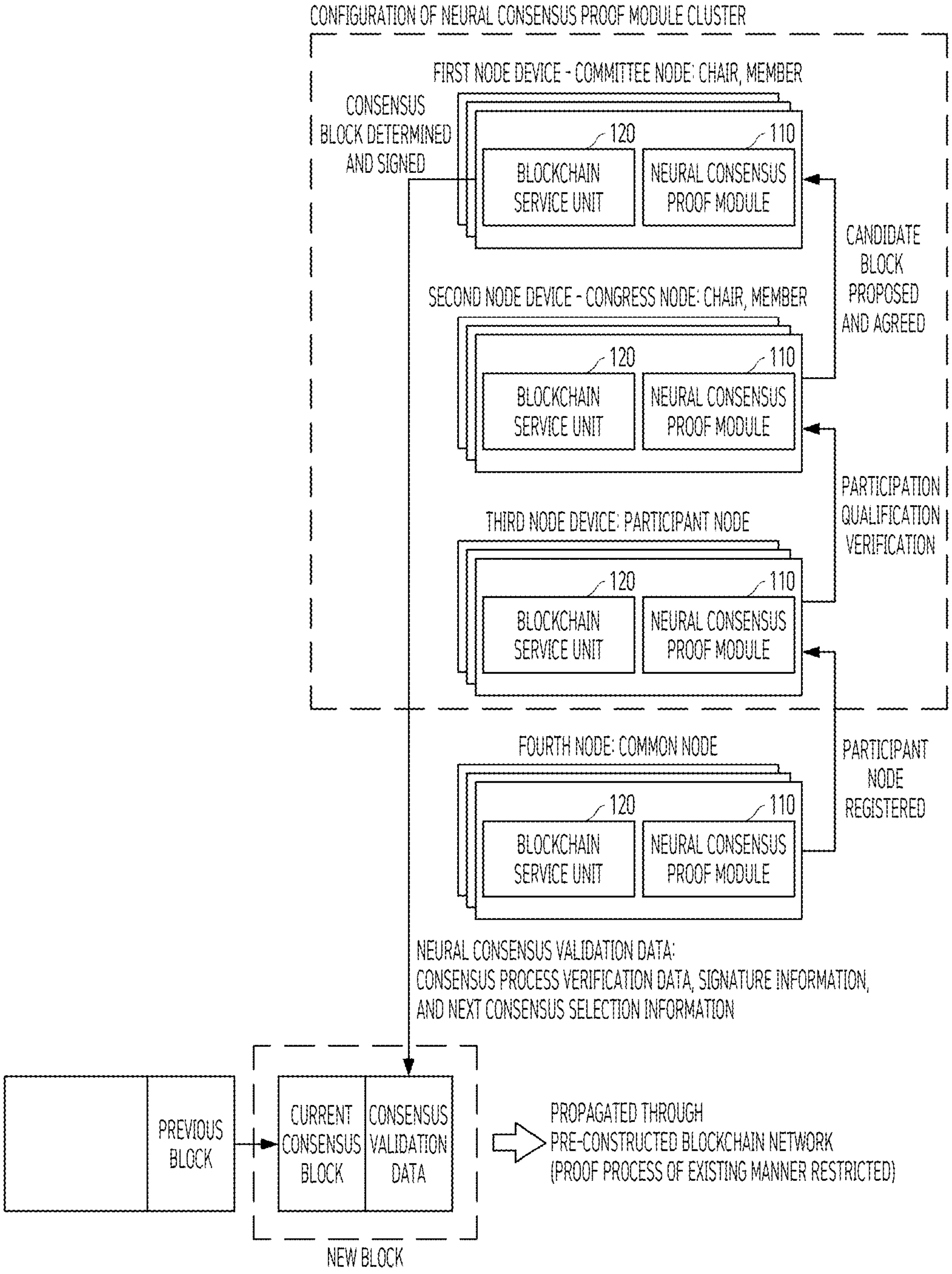
FIG. 4 is a conceptual diagram for explaining the configuration of a neural consensus proof module cluster according to an embodiment of the present disclosure and the block generation process.

FIG. 3 is a block diagram showing in more detail a node device 100 according to an embodiment of the present disclosure and FIG. 4 is a conceptual diagram for explaining the configuration of a neural consensus proof module cluster according to an embodiment of the present disclosure and the entire process.

The node devices 100 of the blockchain system 1000 according to the present disclosure may be included in a neural consensus proof module cluster for configuring a next block through a random node selection process and each may include a neural consensus proof module 110 included in the neural consensus proof module cluster to perform a random consensus proof process according to an embodiment of the present disclosure.

Further, the node devices 100 are connected to the non-random consensus blockchain network 200 and each may include a blockchain service unit 120 performing a sharing-propagating process of a next block configured by the random consensus proof process through the non-random consensus blockchain network 200.

Accordingly, in an embodiment of the present disclosure, the node devices 100 may be node devices 100 that participate in the non-random consensus blockchain network 200, and are selected by the random consensus selection process and selectively granted with a right to be able to create respective blocks in accordance with consensus conference, and accordingly, the random consensus blockchain network system 1000 can be independently constructed.

Further, as shown in FIG. 4, the node devices 100 can selectively perform the functions of a fourth node device that is a common node, a third node device that is a participant node, a second node device that is a congress node, and a first node that is a committee node.

The neural consensus proof module cluster may be constructed with the third node device registered as a participant node for a basis. The participant node that is the third node device can verify a participation qualification on the basis of next consensus selection information that is obtained from consensus validation data of a new propagated block and the second node device may be a terminal that processes a congress node function operation by ascertaining whether a congress node is selected in accordance with the verification result. The first node device may be a terminal that processes a committee node function operation by ascertaining whether a committee node is selected in accordance with the verification result.

A node device 100 selected as a congress node can perform a candidate block proposal and consensus process like the second node device shown in FIG. 4, and a node device 100 selected as a committee node can perform a process of configuring and distributing consensus validation data of a block by determining a consensus block and collecting signature information. In this case, the consensus validation data may include conference process verification data, multiple signature information, and next consensus selection information, and can be propagated through a pre-constructed non-random consensus blockchain network 200.

As a new block is configured and propagated in this way, the proof process of the existing non-random consensus blockchain network 200 can be processed to be restricted and Pow or Pos proof-based next block creation between node devices 100 can be processed only in an exceptional case in which the number of some nodes lacks a number set on the basis of a PBFT standard.

Meanwhile, such a participation qualification and verification information of the nodes 100 can be calculated on the basis of a random value, which is calculated for each node in accordance with participant node registration, and can be mutually opened and verified, in which a nonce chain can be used, as described above. For example, the node devices 100 can be determined as at least one of a participant node, a congress node, a committee node, or a chair node, depending on what value a self qualification verification value accompanying hash processing, which uses a nonce value included in next consensus selection information, a height value of a current block, etc., is.

Further, as shown in FIG. 3, a node device 100 according to an embodiment of the present disclosure includes a device information setting unit 111, a node information setting unit 112, an validation processing unit 113, a qualification verification processing unit 114, a consensus node functioning unit 115, and a data interface unit 116.

The device information setting unit 111 obtains, stores, and manages device information of a terminal 100 in which the neural consensus proof module 110 is installed. In this case, the device information may include at least one of node name information, device address information, device performance information, device reliability information, a used network information of the terminal 100. The device information can be used to recognize or construct a neural consensus proof module cluster, perform a vote consensus process, etc.

The node information setting unit 112 sets node information for registering a non-random consensus blockchain network 200 and a participant node. The set node information may include blockchain network client address information and the terminal 100 can connect to the blockchain network using the blockchain network client address information and can obtain or share block information.

The validation processing unit 113 obtains new block data propagated through the non-random consensus blockchain network 200, extracts validation data from the new block data, and obtains neural consensus designation information of a next block created on the basis a random consensus proof process in accordance with verification processing of the validation data.

Further, the consensus node functioning unit 115 is selectively driven on the basis of the neural consensus designation information of a next block and creates validation data of the next block, and can selectively drive at least one of a chair node functioning unit 1151, a congress node functioning unit 1152, and a committee node functioning unit 1153. The chair node functioning unit 1151 may be selectively operated through at least partial comparison of neural consensus designation information and the nonce value of a designated node device 100, but the present disclosure is not limited to this selection manner.

First, the chair node functioning unit 1151 can perform a chair process corresponding to congress and committee nodes and can collect, from congress nodes, delegation information and participation qualification verification information of an effective transaction block taken from a transaction pool of a blockchain network, and next block consensus candidate information. Accordingly, 3f+1 (f is a natural number) or more congress nodes for the next block can be selected and 2f+1 or more committee nodes can be selected.

Further, the congress node functioning unit 1152 can transmit delegation information and participation qualification verification information of an effective transaction block taken from a transaction pool of the non-random consensus blockchain network 200 to the node device 100 in which the chair node functioning unit 1151 is driven.

Further, the chair node functioning unit 1151 can select a block coinciding over a consensus quorum of a congress node as a candidate block from transaction blocks proposed by the congress node, can transmit a message requesting partial signature processing for multiple signature regions expressing consensus for the candidate block to node devices 100 in which the committee node functioning unit 1153 was driven. For example, the chair node functioning unit 1151 can determine f+1 coinciding transaction data candidate blocks from 2f+1 transaction data candidate blocks and can transmit a message requesting partial signature processing for multiple signature regions to the committee functioning node 1153, and a node 100 in which the committee node functioning unit 1153 was driven can process and transmit partial signatures expressing consensus corresponding to the candidate blocks to the node device 100 in which the chair node functioning unit 1151 was driven Accordingly, the chair node functioning unit 1151 verifies and determines a candidate block for which multiple signature processing has been finished in accordance with committee consensus as distribution block, and creates a new block by creating and combining validation data corresponding to the consensus process with the distribution block.

The data interface unit 116 can convert the crated new block into the format of the non-random consensus blockchain network 200 and then transmit the new block to the blockchain service unit 120.

Then, the blockchain service unit 120 can propagate the new block through the non-random consensus blockchain network 200, and the new block not only can be propagated through the non-random consensus blockchain network 200, but can be added to a transaction data memory pool (mem pool) by operation of a transaction data management unit 121.

Meanwhile, though not shown, the node device 100 may include a memory that the blockchain service unit 120 and the neural consensus proof module 110 can use. The memory may include computer-readable instructions, and as the instructions stored in the memory are executed in a processor, the blockchain service unit 120 and the neural consensus proof module 110 can perform the operations described above. The memory may be a volatile memory or a nonvolatile memory.

The memory may include a storage to store data of a user. The storage may be an embedded multimedia card (eMMC), a solid state drive (SSD), a universal flash storage (UFS), etc. The storage may include at least one or more nonvolatile memory device. The nonvolatile memory device may be a NAND Flash Memory, a Vertical NAND (VNAND), a NOR Flash Memory, a Resistive Random Access Memory (RRAM), a Phase-Change Memory (PRM), a Magnetoresistive Random Access Memory (MRAM), a Ferroelectric Random Access Memory (FRAM), a Spin Transfer Torque Random Access Memory (STT-RAM), etc.

Figure 5:
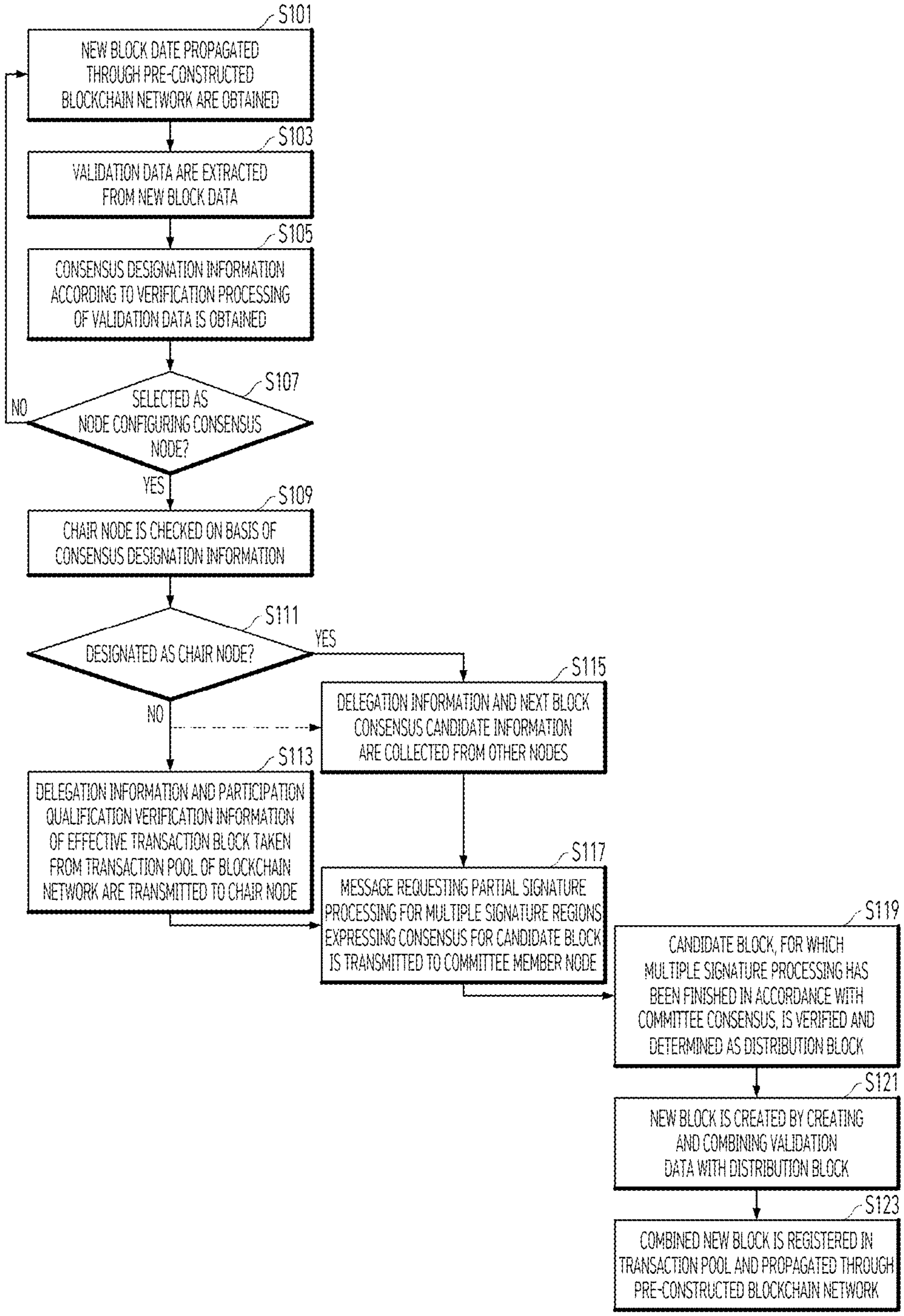
FIG. 5 is a flowchart for explaining a method of operating the node device according to an embodiment of the present disclosure.

FIG. 5 is a flowchart for explaining a method of operating a node device 100 according to an embodiment of the present disclosure.

Referring to FIG. 5, when a node device 100 according to an embodiment of the present disclosure obtains new block data propagated through a pre-constructed non-random consensus blockchain network (S101), the validation processing unit 113 extracts validation data from the new block data and obtains consensus designation information according to verification processing of the validation data (S103).

The validation processing unit 113 can obtain neural consensus designation information of a next block created on the basis of a random consensus proof process, in accordance with verification processing of the validation data, and as described above, the validation data may include consensus process verification data corresponding to the random consensus proof process.

For example, the consensus process verification data may include nonce chain-based qualification proof hash data and multiple signature data formed by combining partial signatures of the congress node as member qualification verification information of a congress node that processes consensus for transaction data. Further, the neural consensus designation information of a next block may include nonce information for verifying the neural consensus participation qualification corresponding to the next block.

Then, the node device 100 determines whether it has been selected as a node configuring a neural consensus proof cluster node for the next block (S107), and ascertains whether it is a chair node on the basis of consensus designation information when it has been selected (S109).

When the node device has not been selected as a chair node, it can transmit delegation information and participation qualification information of the effective transaction block taken from the transaction pool of the blockchain network in accordance with the qualification to a congress chair node (S113).

Accordingly, a node device 100 in which the chair node functioning unit 1151 was driven can collect delegation information and next block consensus candidate information from other nodes (S115).

Further, the node device 100 in which the chair node functioning unit 1151 was driven determines an agreed candidate block from node devices 110 in which the congress node functioning units 1152 were driven, and transmits a message requesting partial signature processing for multiple signature regions expressing consensus for the candidate block to a committee member node (S117).

Further, the node device 100 in which the chair node functioning unit 1151 was driven verifies and determines a candidate block, for which multiple signature processing has been finished in accordance with the committee consensus, as a distribution block (S119), creates a new block by creating and combining validation data with the distribution block (S121), registers the combined new block into the transaction pool of the non-random consensus blockchain network 200, and propagates the new block through the pre-constructed non-random consensus blockchain network 200 (S123).

FIGS. 6 to 9 are diagrams exemplifying data of each step that are processed by a consensus proof module node device according to an embodiment of the present disclosure.

Figure 6:
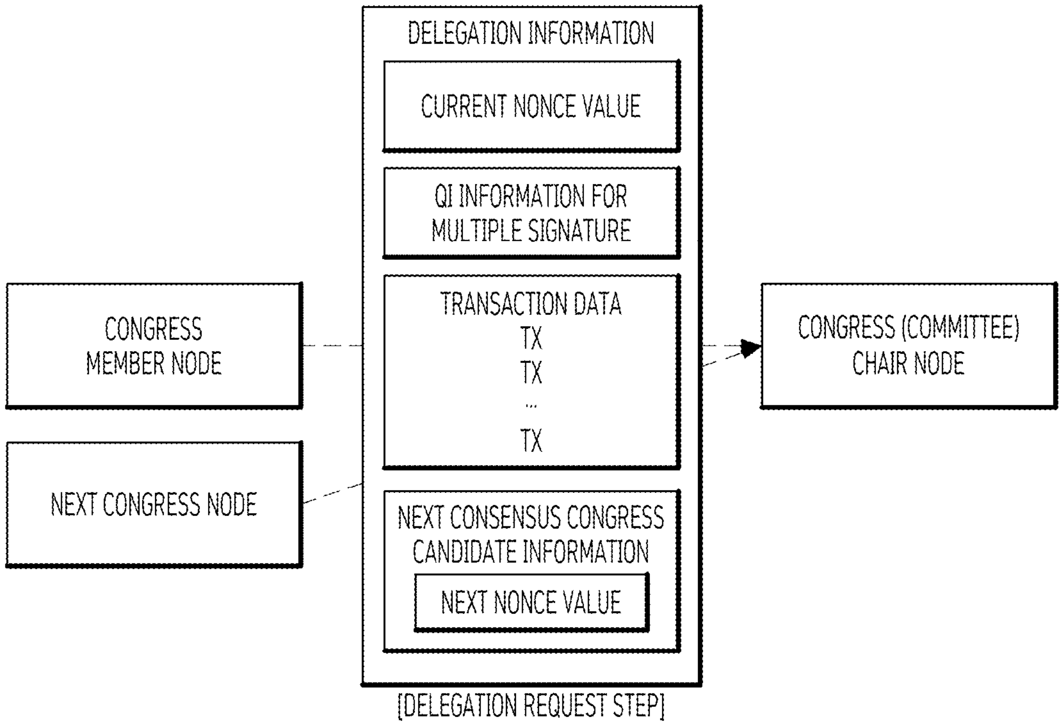
FIGS. 6 to 9 are diagrams exemplifying data by step that are processed by a consensus proof module node device according to an embodiment of the present disclosure.

FIG. 6 exemplifies delegation information that is transmitted to a chair node in a delegation request step for configuring a current block, in which a nonce value corresponding to a current block height, Qi value information that each congress node intends to use for multiple signatures, transaction data, next consensus congress candidate information, and a nonce value of the next block height may be included in the delegation information.

Figure 7:
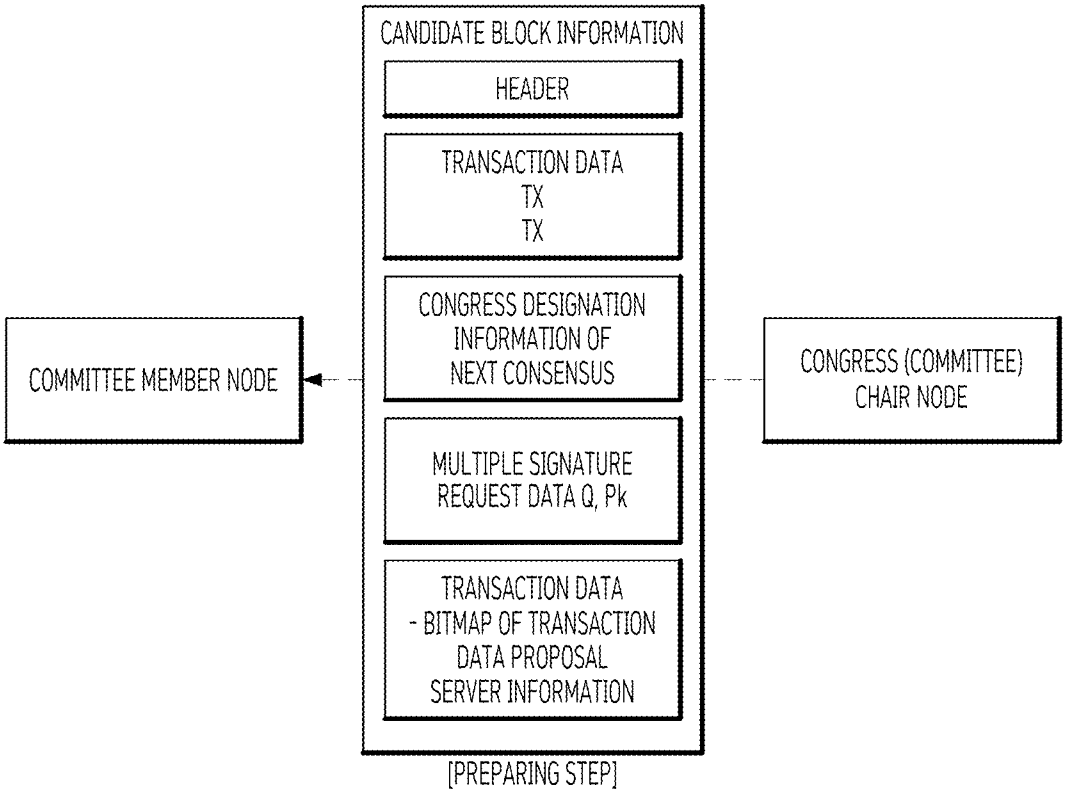

Further, FIG. 7 exemplifies candidate block information that is transmitted to a committee node from a chair node in a preparation step, in which the candidate block information may include header information including a Merkle root, candidate block transaction data, congress designation information of a next consensus, multiple signature request data (Q data integrating Qi, open key Pk), and verification data. Bitmap information that makes it possible to recognize server information proposing transaction data, etc. may be exemplified as the verification data, which makes it possible to prevent a case, etc. proposed by a chair node itself.

Figure 8:
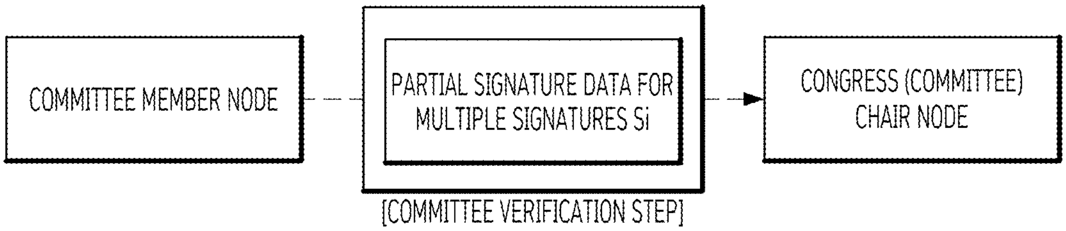

Further, FIG. 8 exemplifies partial signature data that are propagated to a chair node from a committee node in a process in which committee verification is processed, in which the chair node can calculate signature completion data S by integrating partial signature data Si.

Figure 9:
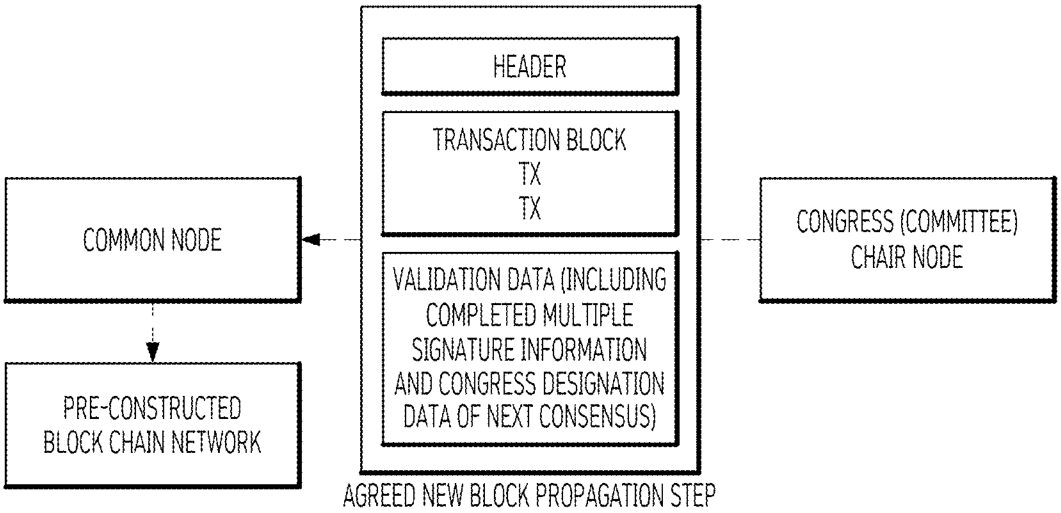

Meanwhile, FIG. 9 shows the configuration of a new block that is created and propagated in accordance with an embodiment of the present disclosure, in which the new block may include header information, transaction block information, and validation data. The validation data, as described above, may include next consensus designation information, completed multiple signature information, and various items of information that can verify a consensus process and a participation qualification. Further, a Merkle root value for validation of block data themselves, etc. may be included also in the header information.

Accordingly, the validation processing unit 113 primarily verifies a consensus process by first ascertaining multiple signature information, can perform secondary verification by ascertaining whether the Merkle root value of a header is normal, and performs third verification by comparing the Merkle root value with a Merkle root value calculated again using transaction block information, thereby enabling safe processing of a transaction block.

Figure 10:
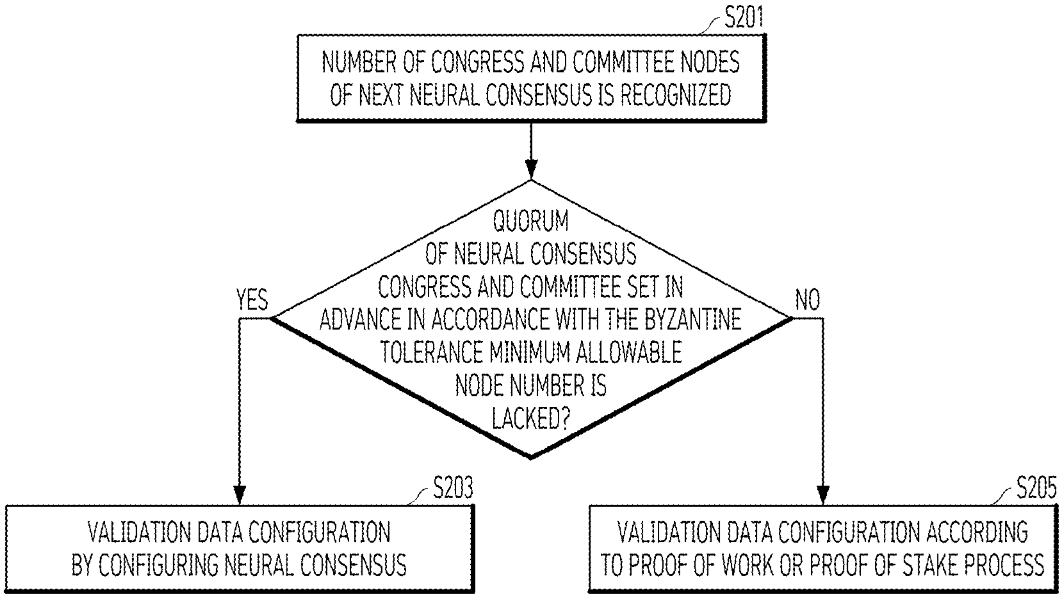
FIG. 10 is a flowchart for explaining a method of operating a node device according to another embodiment of the present disclosure.

FIG. 10 is a flowchart for explaining a method of operating a node device device according to another embodiment of the present disclosure.

Referring to FIG. 10, a node device 100 according to another embodiment of the present disclosure first recognizes the number of congress and committee nodes of a next neural consensus (S201).

Further, the node device 100 determines whether a preset consensus quorum is not reached on the basis of Byzantine tolerance minimum allowable node number.

For example, a consensus quorum can be determined by a maximum Byzantine number (maximum allowable number of malicious nodes) that can be selected by a node selection probability P in correspondence to the number N of participant nodes, and when congress nodes are at least 3f+1 (f is a natural number) and committee nodes are at least 2f+1 or more, the nodes can satisfy the consensus quorum.

When the number of consensus nodes lacks the quorum of neural consensus congress and committee set in advance in accordance with the Byzantine tolerance minimum allowable node number, the node device 100 performs selective exceptional processing of forming the validation data of a next block in the Proof of Work (PoW) or Proof of stake (Pos) manner (S205).

On the contrary, when the number of consensus nodes is equal to or more than the quorum of neural consensus congress and committee set in advance in accordance with the Byzantine tolerance minimum allowable node number, the Proof of Work (PoW) or Proof of stake (Pos) process of the non-random consensus proof-based blockchain network is restricted, a neural consensus is configured using the process of FIG. 5 described above, and validation data are configured, thereby being able to create and propagate a new block (S203).

Figure 11:
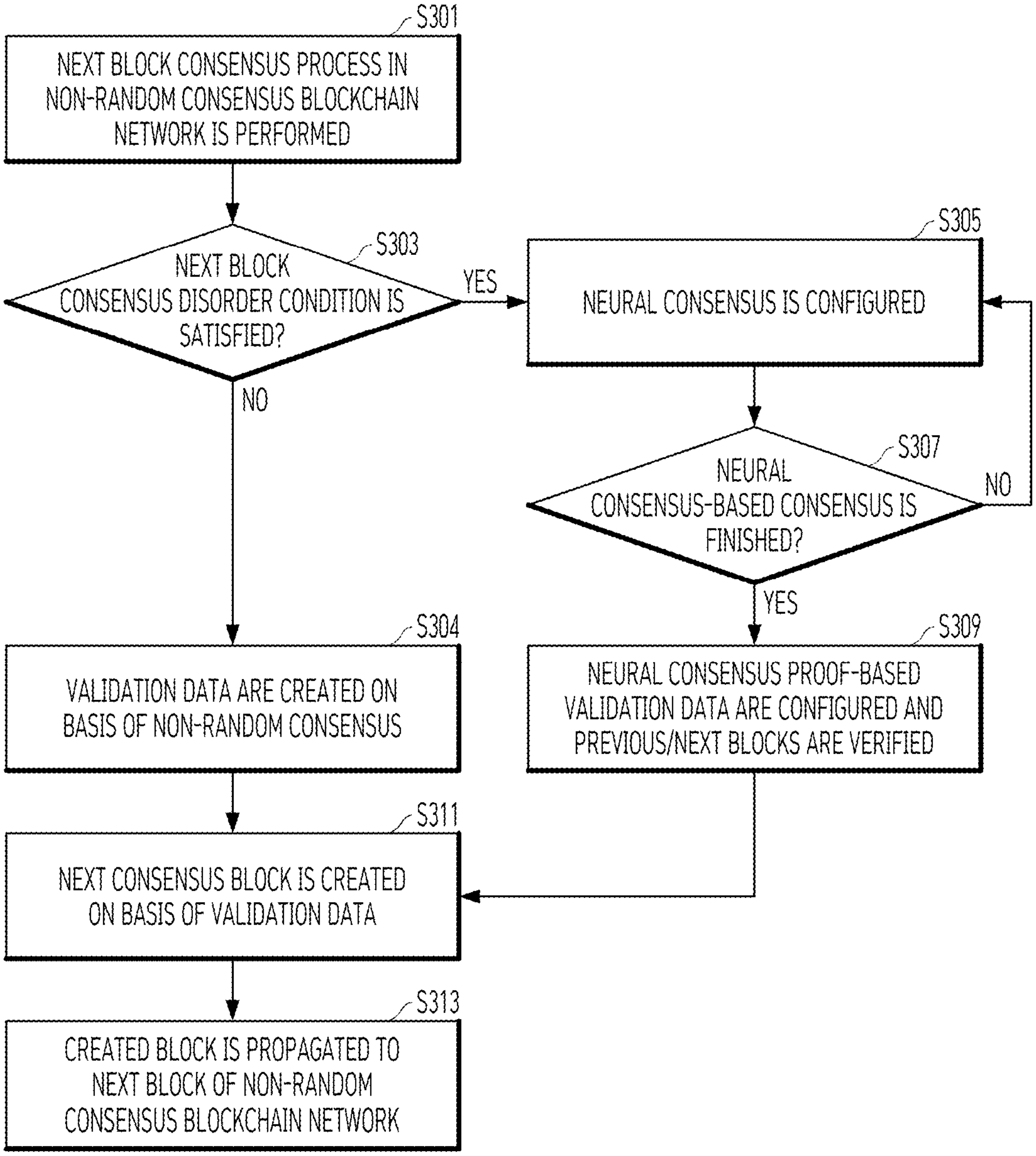
FIG. 11 is a flowchart for explaining a method of operating a node device according to another embodiment of the present disclosure.

FIG. 11 is a flowchart for explaining a method of operating a node device device according to another embodiment of the present disclosure.

Referring to FIG. 11, performing processes of recognition or construction of a neural consensus proof module cluster and a vote consensus process according to another embodiment of the present disclosure can be used to quickly create a next block to secure continuity when a disorder is generated in a non-random consensus blockchain network 200.

In general, in a non-random consensus manner of proof of work or proof of stake such as Ethereum, there are problems such as timeout of a block creation cycle or unstable consensus by repeated transactions due to abnormal service driving or overload. Accordingly, a service is temporarily stopped or hardfork is performed, so a current non-random consensus blockchain network 200 is not guaranteed with sufficient continuity in block creation and is vulnerable to dealing with disorders.

Accordingly, a process, which performs recognition or construction of a neural consensus proof module cluster and a vote consensus process according to an embodiment of the present disclosure, is complementarily performed when a disorder is generated while the existing non-random consensus blockchain network 200 is driven, so the process can be applied in a manner of securing continuity.

This can be achieved by setting one or more of node devices constituting the existing non-random consensus blockchain network 200 to operate as the node device 100 constituting the neural consensus proof module cluster described above without constructing a specific infrastructure when a preset disorder condition is generated.

In more detail, referring to FIG. 11, the node devices 100 according to an embodiment of the present disclosure may be node devices constituting the non-random consensus blockchain network 200 and may be terminals that operate as node device 100 constituting a neural consensus proof module cluster and configure and propagate neural consensus-based validation data as a next block when a preset next block consensus disorder condition is generated.

For such configuration, the node devices 100 may be driven as devices constituting a preset neural consensus proof module cluster and may be driven in a continuity security mode for securing continuity unlike converting and driving the existing block chain described above.

For example, the node devices 100 can be driven in any one of a network conversion mode in which the node devices 100 convert and use the existing non-random consensus blockchain network 200 as a random consensus blockchain network and a continuity security mode in which the node devices 100 are driven in an assistant manner when a disorder is generated in the existing non-random consensus blockchain network 200, and FIG. 11 shows the operation in the continuity security mode.

First, a node device 100 performs a next block consensus process in a common non-random consensus blockchain network 200 (S301).

Further, the node device 100 determines whether a next block consensus disorder condition is generated (S303).

In this case, various conditions may be set in advance for the next block consensus disorder condition, and preferably, a timeout condition when a block is not created for a first time may be used. For example, the first time may be the same as a second time that is a timeout time prescribed in the process of proof of work or proof of stake of the non-random consensus blockchain network 200.

Further, the first time may be set as a time shorter than the second time in consideration of continuity of work such that configuring a neural consensus proof module cluster is processed earlier than the timeout of the non-random consensus blockchain network 200.

Further, temporal service stop, etc. may be exemplified as the next block consensus disorder condition. For example, when the service of the non-random consensus blockchain network 200 is stopped due to hardfork or temporal service operation problem, assistant block creation processing that accompanies configuring a neural consensus proof module cluster may be set to be continuously performed.

When a disorder condition about the next block consensus is not generated, non-random consensus-based validation data on the non-random consensus blockchain network 200 are created in the manner of common proof of work or proof of stake (S304).

Further, when a disorder condition about the next block consensus is generated, the node device 100 described above can operates as the node device 100 constituting a neural consensus proof module cluster and performs the random-type neural consensus proof module cluster configuration process described with reference to FIGS. 4 and 5 and a consensus process based on the process (S305).

When consensus based on the neural consensus proof module cluster is finished (S307), the node device 100 configures neural consensus proof-based validation data and verifies data effectiveness between a previous block and a next block configured in the non-random consensus blockchain network 200 on the basis of the configured validation data (S309).

In this case, specific height information, previous block information, and next block information can be used for data validation between the previous block and the next block, and a block of non-random consensus format that can be used in the non-random consensus blockchain network 200 can be used through validation on the basis of the information.

Thereafter, the node device 100 creates a next consensus block based on the non-random consensus-based validation data in step S304 or the neural consensus proof-based validation data verified in step S309 (S311).

For example, the node device 100 creates a next block including the neural consensus proof-based validation data, that is, can create a next block of non-random consensus format verified by step S309. In more detail, when a current maximum height is 100, the node device 100 can create a next block that makes consensus be restarted on the non-random consensus blockchain network 200 from a block having a height of 110.

Further, the node device 100 propagates the created block as the next block of the non-random consensus blockchain network 200 (S313).

As such process of the node device 100 is performed, a neural consensus proof-based block creation process, which is driven in an assistant manner when a disorder is generated in the non-random consensus blockchain network 200 of proof of work or proof of stake manner such a Ethereum or Bitcoin, is performed, so continuity of a service can be sufficiently secured.

Figure 12:
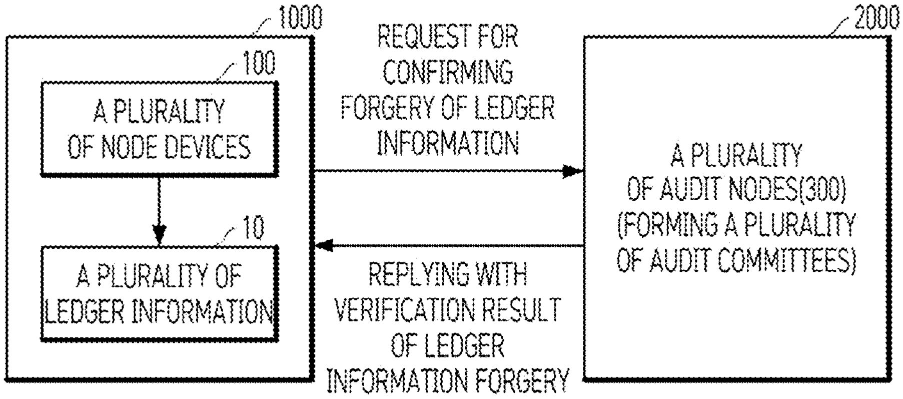
FIG. 12 is a diagram for explaining a system for auditing for forgery of ledger information by using a plurality of audit committees according to an exemplary embodiment of the present disclosure.

FIG. 12 is a diagram for explaining a system for auditing for forgery of ledger information by using a plurality of audit committees according to an exemplary embodiment of the present disclosure. In the present exemplary embodiment, an exemplary embodiment will be described where forgery is audited through an audit network 2000 when the originality is damaged in a neural consensus proof-based blockchain network 1000 described above and the originality of the blockchain network 1000 is restored by using an audit ledger information of the audit network 2000.

In the present exemplary embodiment, the audit network may include a plurality of audit nodes 300, and the plurality of audit nodes 300 may compose a plurality of audit committees that operate in different proof methods.

In this case, the plurality of audit nodes 300 may be divided into and belong to the plurality of audit committees, and the plurality of audit committees may generate its respective audit block through its respective proof method.

In the system for auditing for forgery (or the system for auditing for forgery of ledger information) by using the plurality of audit committees shown in FIG. 12, when external data for electronic notarization is generated, the external data may be provided to the blockchain network 1000 and the audit network 2000, respectively, and the blockchain network 1000 may update each ledger information of the plurality of node devices 100 with the ledger information including the external data by the neural consensus proof-based block generation process, and the audit network 2000 may update a plurality of audit ledger information corresponding to each of the plurality of audit committees with the audit ledger information including the external data by each block generation process of the plurality of audit committees. In this way, the plurality of audit committees of the audit network 2000 may update the latest block in order to have the same ledger information as the blockchain network 1000.

As an exemplary embodiment, the plurality of ledger information may include an electronic notarization document or a hash value extracted from the electronic notarization document.

In such an environment, when the forgery occurs in the ledger information of the blockchain network 1000, the forgery of the ledger information of the blockchain network 1000 may be verified and the originality may be restored by using the audit ledger information stored in the audit network 2000.

First, each ledger information 10 of the plurality of node devices 100 composing the neural consensus proof module cluster of the neural consensus proof-based blockchain network 1000 may be extracted in order to determine whether the originality of the neural consensus proof-based blockchain network 1000 is damaged. Then, the plurality of extracted ledger information 10 may be compared with each other. In this case, when a discrepancy is found between the plurality of ledger information 10, a request for confirming forgery of the ledger information may be sent to the audit node 300 in the audit network 2000, assuming that the ledger information of the plurality of node devices 100 is damaged.

Meanwhile, when verifying integrity through a typical consensus algorithm, ledger information may be considered to be damaged when 51% consensus is not achieved for a plurality of ledger information 10, but in the present exemplary embodiment, when even a ledger information not identical with another ledger information is among the plurality of ledger information 10 (i.e., when any ledger information is different from another ledger information among the plurality of ledger information), it may be determined that the ledger information is damaged and a request for confirming forgery of the ledger information is transmitted. This may be because when a 51% attack on the plurality of ledger information 10 is successful, it may be possible that the ledger information is damaged even when there is a consensus of more than 51%. In this case, it may be not possible to accurately determine whether the ledger information is damaged only by the consensus process for the plurality of ledger information 10. Therefore, in the present exemplary embodiment, it may be determined that the ledger information is damaged when even a ledger information not identical with another ledger information is among the plurality of ledger information 10.

When it is determined that the ledger information of the blockchain network 1000 is damaged, a request for confirming forgery of the ledger information may be transmitted to the audit network 2000, and the audit network 2000 may reply with the verification result of the ledger information forgery after verifying the forgery of the plurality of ledger information 10 through the plurality of audit nodes 300.

To describe this in more detail, the plurality of audit nodes 300 may compose the plurality of audit committees, and the plurality of audit nodes 300 may be divided into and belong to the plurality of audit committees.

Each of the plurality of audit committees may be an audit committee having different proof methods, and, using its own proof method, may prove the audit ledger information corresponding to each of the plurality of audit committees (i.e., the audit ledger information held by the audit node belonging to each audit committee).

Then, the largest number of audit ledger information among the plurality of audit ledger information proved by each audit committee may be determined as first audit ledger information whose originality is proven. That is, each audit committee may prove the originality of its owned audit ledger information, and on the basis of the proved results, the audit ledger information, whose originality is proven by the largest number of audit committees, may be determined as the first audit ledger information (determining the first audit ledger information by voting).

When all audit committees prove the same audit ledger information A, the corresponding audit ledger information A may be determined as the first audit ledger information. Alternatively, when among all audit committees 70% of the audit committees prove the audit ledger information A and 30% of the audit committees prove the audit ledger information B, the audit ledger information A, whose originality is proved by a greater number of audit committees, may be determined as the first audit ledger information.

As an exemplary embodiment, each of different proof methods of the plurality of audit committees may be a proof method performed by any one of Proof of Work (PoW), Proof of Stake (PoS), Delegated Proof of Stake (DPoS), Zero-Knowledge Proof, Practical Byzantine Fault Tolerance (PBFT), and a neural consensus proof-based random consensus algorithm.

In this way, the reason for configuring the proof methods of the plurality of audit committees differently from each other may be for increasing the safety of the audit network 2000. In blockchain technology, each proof method may have its own advantages and disadvantages, and its vulnerabilities may be different. Accordingly, when the proof methods of the plurality of audit committees are all the same, the same vulnerability may be exposed to external attacks, thereby increasing the likelihood that the plurality of audit committees will be attacked at the same time. However, like the present disclosure, when the proof methods of the plurality of audit committees are configured differently from each other, the vulnerability of each audit committee may become also different, so the case where all audit committees are simultaneously attacked by an external attack can be minimized and even when attacks on some audit committees are successful, the remaining audit committees can be safely maintained, such that the originality of the entire audit network 2000 can be restored and maintained.

Meanwhile, when the first audit ledger information whose originality is proven is determined, the audit network 2000 may verify forgery of the plurality of ledger information 10 by comparing the first audit ledger information with the plurality of ledger information 10 and may reply with the forgery verification result. To this end, the one or more audit nodes 300 may be provided with the same transaction data as the transaction data provided to the blockchain network 1000 and may record the transaction data in each audit ledger information of the one or more audit nodes 300 through the block generation process of the audit network 2000. Then, the forgery of the ledger information may be verified by comparing whether the plurality of ledger information 10 are identical with the audit ledger information. For example, the audit network 2000 may determine the ledger information identical to the first audit ledger information among the plurality of ledger information 10 as the ledger information that is not forged, and determine the ledger information not identical to the first audit ledger information among the plurality of ledger information 10 as the forged ledger information.

According to the exemplary embodiment described in FIG. 12, the external data for electronic notarization may be stored in both the blockchain network 1000 and the audit network 2000, and even when the ledger information of the blockchain network 1000 is damaged by attack, the integrity of the ledger information of the blockchain network 1000 may be restored by using the audit ledger information stored in the audit network 2000. In addition, the audit network 2000 may be composed of the plurality of audit committees having different proof methods, and maintain, preserve, and restore the originality in a safer state against external attacks since the audit ledger information whose originality is proved by voting is maintained between audit committees.

As an exemplary embodiment, the audit network 2000 may be a network separated from the blockchain network 1000. This may be for minimizing the likelihood that the blockchain network 1000 and the audit network 2000 are attacked together, by maintaining the audit network 2000 separate from the blockchain network 1000.

Figure 13:
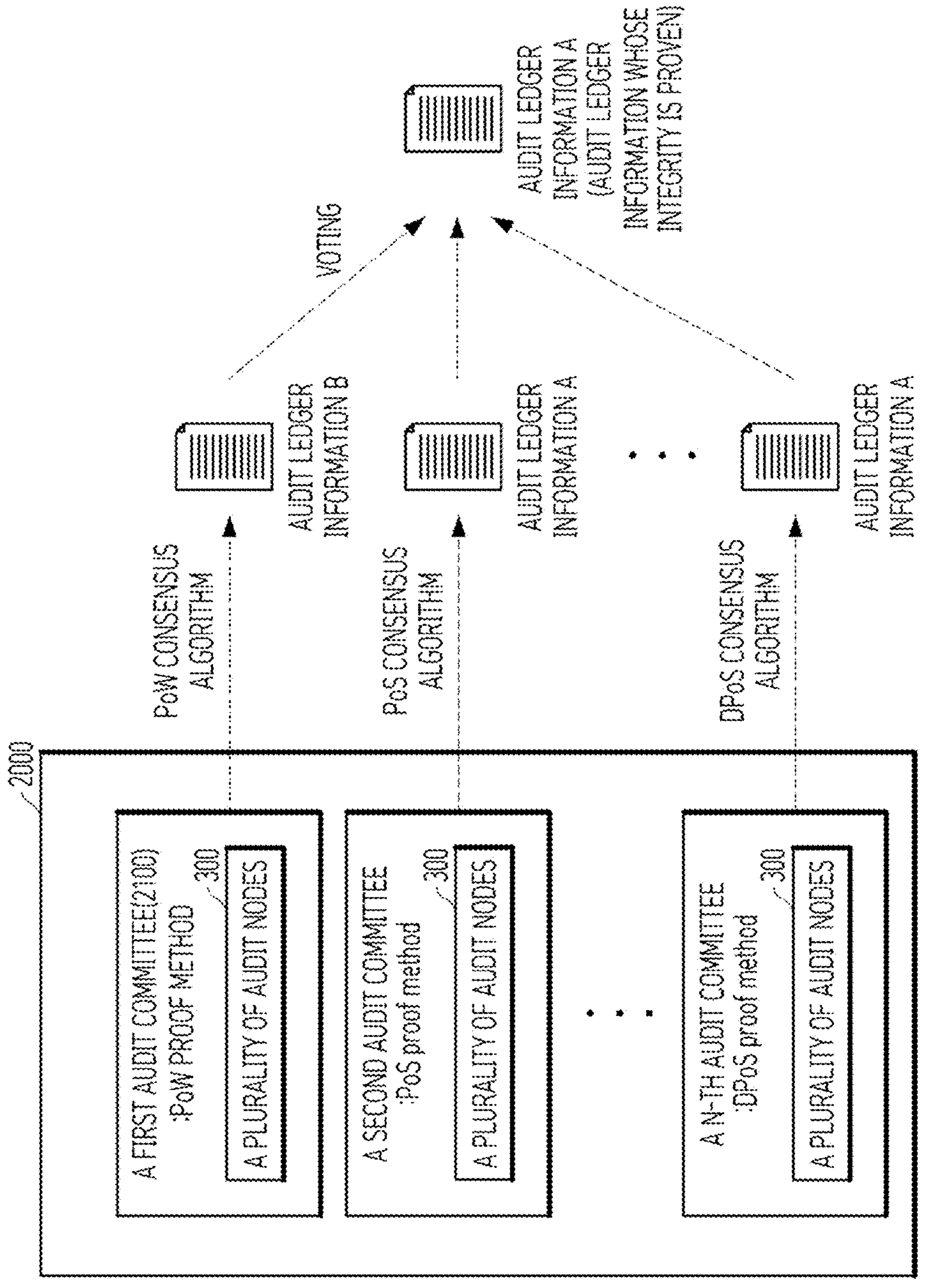
FIG. 13 is a diagram showing in more detail a configuration and operation method of an audit network 2000.

FIG. 13 is a view showing in more detail a configuration and operation method of an audit network 2000 of FIG. 12. Referring to FIG. 13, the audit network 2000 may include a first audit committee 2100, a second audit committee 2200, and an n-th audit committee 2300.

Each audit committee 2100, 2200, 2300 may include a plurality of audit nodes 300, prove the originality of the audit ledger information held by the audit node 300 belonging to itself through its own proof method, and generate an independent audit block through the consensus algorithm according to the proof method described above.

As an exemplary embodiment, each audit committee 2100, 2200, 2300 may be an audit committee having a different proof method. For example, the first audit committee 2100 may be an audit committee with a PoW proof method, the second audit committee 2200 may be an audit committee with a PoS proof method, and the n-th audit committee 2300 may be an audit committee with a DPoS proof method.

In order to verify forgery with respect to the ledger information of the blockchain network 1000, each audit committee 2100, 2200, 2300 may first prove its own audit ledger information. For example, the first audit committee 2100 may prove the originality of its audit ledger information by using a PoW proof method, the second audit committee 2200 may prove the originality of its audit ledger information by using a PoS proof method, and the n-th audit committee 2300 may prove the originality of its audit ledger information by using a DPoS proof method.

Then, the audit ledger information, which is supported by the largest number of audit committees on the basis of the proving results of each audit committee 2100, 2200, 2300, may be determined (voting) as the first audit ledger information whose originality is proven.

For example, when the first audit committee 2100 proves the audit ledger information B through the PoW consensus algorithm, the second audit committee 2200 proves the audit ledger information A through the PoS consensus algorithm, and the n-th audit committee 2300 proves the audit ledger information A through the DPoS consensus algorithm, the audit ledger information A, whose originality is proved by the larger number of audit committees 2200, 2300, may be determined as the first audit ledger information, which is the true audit ledger information. Then, on the basis of the determined first audit ledger information, the forgery of the ledger information of the blockchain network 1000 may be verified, and the blockchain network 1000 may be capable of restoring the originality of the ledger information by receiving the verification result.

At this time, the first audit committee 2100 that proves the audit ledger information B different from the first audit ledger information may once again perform a consensus algorithm and update its own audit ledger information with the first audit ledger information.

Figure 14:
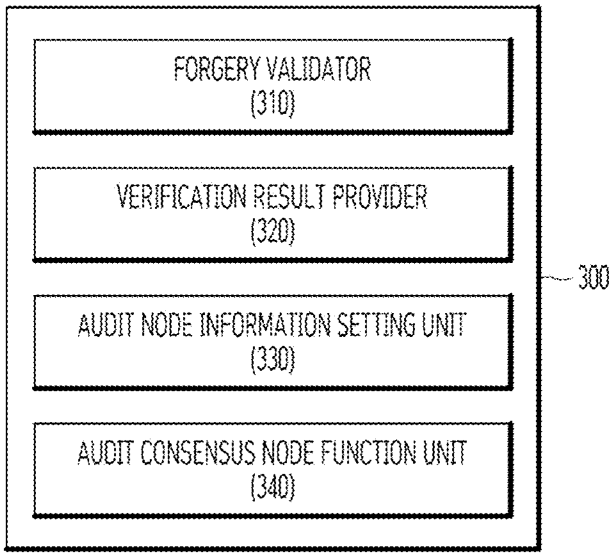
FIG. 14 is a block diagram showing a detailed configuration of an audit node 300 according to an exemplary embodiment of the present disclosure.

FIG. 14 is a view showing a detailed configuration of an audit node 300 according to an exemplary embodiment of the present disclosure. Referring to FIG. 14, the audit node 300 may include a forgery validator 310, a verification result provider 320, an audit node information setting unit 330, and an audit consensus node function unit 340.

The forgery validator 310 may verify whether the plurality of ledger information 10 extracted from the plurality of node devices 100 are forged. In this case, it may be determined that the ledger information 10 is forged when there is a discrepancy between the plurality of ledger information 10, but the forgery validator 310 may further determine which ledger information is forged among the plurality of ledger information 10 by comparing each of the plurality of ledger information 10 with the first audit ledger information. For example, suppose that the first ledger information and the second ledger information among the plurality of ledger information 10 are different from each other. In this case, when the first ledger information is identical with the first audit ledger information, on the basis of this, the forgery validator 310 may determine that the first ledger information is correct ledger information and the second ledger information is damaged ledger information.

The verification result provider 320 may generate a verification result based on the verification result of the forgery validator 310 and may provide the same to the blockchain network 1000. In this case, the verification result provider 320 may provide the first audit ledger information, whose integrity is proven, to the blockchain network 1000 in order to restore the originality of the blockchain network 1000.

As an exemplary embodiment, the verification result provider 320 may reply to the blockchain network 1000 with the ledger information identical with the first audit ledger information among the plurality of ledger information 10 as the ledger information whose originality is proven. Alternatively, the verification result provider 320 may directly reply to the blockchain network 1000 with the first audit ledger information, whose originality is proven, without referring to the plurality of ledger information 10. The blockchain network 1000 may restore the integrity of ledger information of the plurality of node devices 100 by generating and distributing the next block on the basis of the provided first ledger information.

The audit node information setting unit 330 may set audit node information for registering the audit node 300. The set audit node information may include client address information of an audit network, and the audit node 300 may access the audit network 2000 through the client address information of the audit network to obtain or share block information.

The audit consensus node function unit 340 may operate a consensus algorithm for generating a block in the audit committee where the audit node 300 belongs. In this case, the consensus algorithm may include Proof of work (PoW), Proof of Stake (PoS), Delegate Proof of Stake (DPoS), Zero-Knowledge Proofs, Practical Byzantine Fault Tolerance (PBFT), or a random consensus algorithm based on neural consensus proof, as described above, and by the consensus algorithm, the audit ledger information may be updated in the audit committee.

Figure 15:
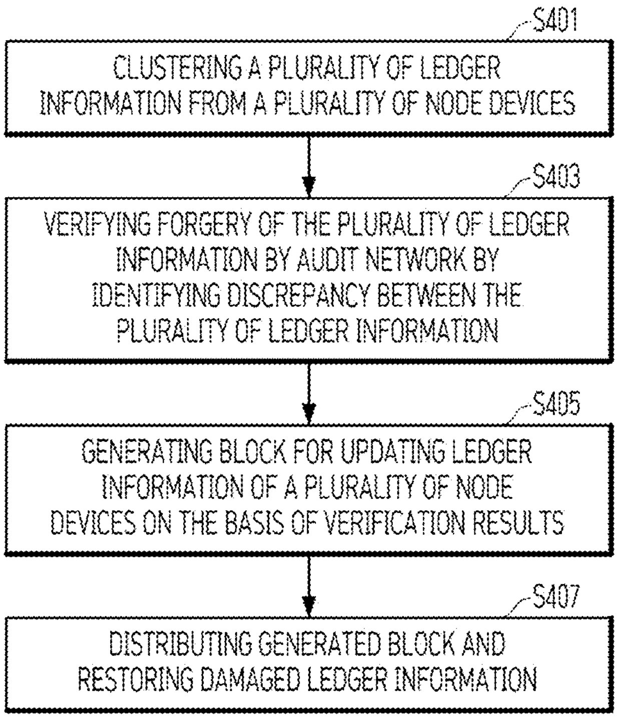
FIG. 15 is a flowchart showing a method for auditing for forgery of ledger information by using a plurality of audit committees according to an exemplary embodiment of the present disclosure.

FIG. 15 is a flowchart showing a method for auditing for forgery of ledger information according to an exemplary embodiment of the present disclosure. The method for auditing for forgery of ledger information of FIG. 4 may be performed by the system 4 for auditing for forgery of ledger information shown in FIG. 1.

First, a plurality of ledger information may be clustered from a plurality of node devices in the blockchain network for electronic notarization (S401).

Then, a discrepancy between the plurality of clustered ledger information may be identified, and in response to the discrepancy, the forgery of the plurality of ledger information may be verified by the audit network (S403).

In this case, when any ledger information is different from ledger information another among the plurality of ledger information, it may be determined that the ledger information agreed by the plurality of node devices is damaged.

In addition, the plurality of ledger information may be compared with the first audit ledger information, whose integrity is proven by the audit node, and the ledger information identical with the first audit ledger information among the plurality of ledger information may be determined as the first ledger information whose integrity is proven.

Next, a block for updating ledger information of the plurality of node devices may be generated on the basis of the verification result (S405). For example, the first ledger information determined in advance may be provided to the neural consensus proof-based blockchain network as a verification result, and the plurality of node devices in the neural consensus proof-based blockchain network may generate blocks for updating the ledger information on the basis of the provided first audit ledger information.

Then, the generated block may be distributed to the neural consensus proof-based blockchain network, and through this, the damaged ledger information in the blockchain network may be restored (S407).

Figure 16:
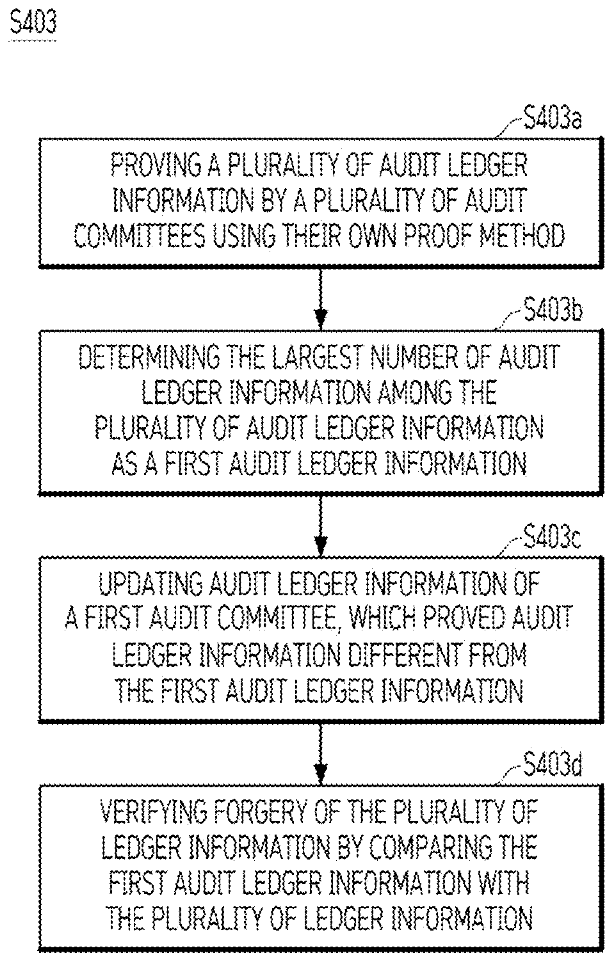
FIG. 16 is a flowchart showing an exemplary embodiment where the step S403 of FIG. 15 is further specified in detail.

FIG. 16 is a flowchart showing an exemplary embodiment where the step S403 of FIG. 15 is further specified in detail.

First, the plurality of audit committees in the audit network may prove a plurality of audit ledger information corresponding to each of the plurality of audit committees by their own proof method (S403*a*).

Then, the ledger information proved by the largest number of audit committees among the plurality of audit ledger information may be determined as the first audit ledger information where the originality of the audit network is proven (S403*b*).

Then, the first audit committee among the plurality of audit committees, which proves the audit ledger information different from the first audit ledger information, may update its own audit ledger information with the first ledger information (S403*c*). Through this, it may be possible to restore the originality of the audit committee whose originality is damaged.

Then, the first audit ledger information may be compared with the plurality of ledger information of the blockchain network, and on the basis of this, the forgery of the plurality of ledger information may be verified.

Hereinafter, an exemplary computing device 500 in which methods described in various embodiments of the present disclosure are implemented will be described with reference to FIG. 17. For example, the computing device 500 of FIG. 17 may be the node device 100 of FIG. 12 or the audit node 300 of FIG. 12.

Figure 17:
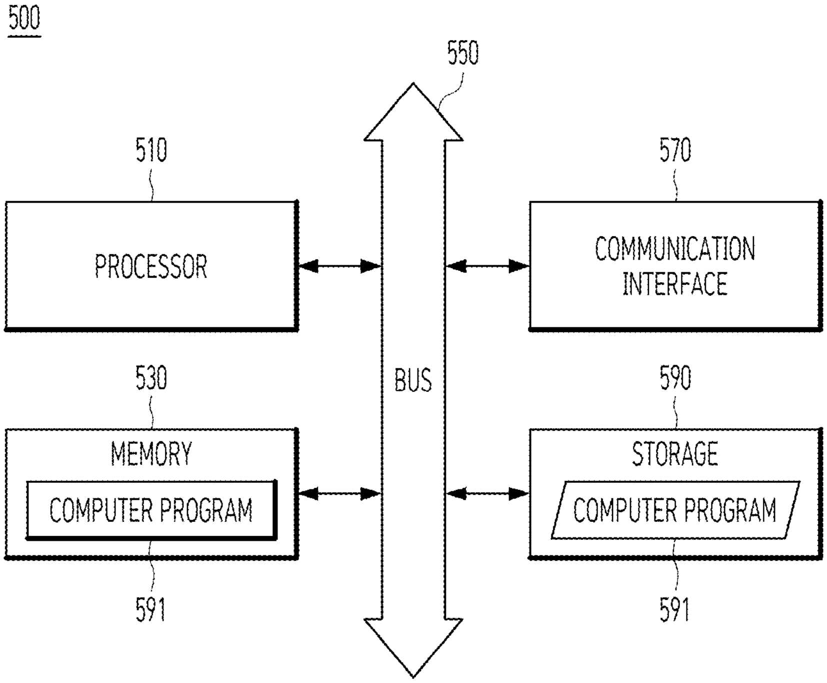
FIG. 17 is a block diagram illustrating the hardware configuration of a computing device used to implement various embodiments of the present disclosure.

FIG. 17 is an exemplary hardware configuration diagram illustrating the computing device 500.

As shown in FIG. 17, the computing device 500 may include one or more processors 510, a bus 550, a communication interface 570, a memory 530 for loading a computer program 591 executed by a processor 510, a storage 590 for storing computer programs 591. However, only components related to the embodiment of the present disclosure are shown in FIG. 17. Accordingly, those skilled in the art will appreciate that other general-purpose components other than those shown in FIG. 17 may be further included.

The processor 510 controls the overall operation of each component of the computing device 500. The processor 510 may be configured to include a central processing unit (CPU), micro-processor unit (MPU), micro-controller unit (MCU), and graphic processing unit (GPU), or at least one of any type of processor well known in the art. Additionally, the processor 510 may perform operations on at least one application or program to execute methods/operations according to various embodiments of the present disclosure. The computing device 500 may include one or more processors.

The memory 530 stores various data, commands and/or information. The memory 530 may load one or more programs 591 from the storage 590 to execute methods/operations according to various embodiments of the present disclosure. An example of the memory 530 may be RAM, but is not limited thereto.

The bus 550 provides communication functionality between components of computing device 500. The bus 550 may be implemented as various types of buses, such as an address bus, a data bus, and a control bus.

The communication interface 570 supports wired and wireless Internet communication of the computing device 500. The communication interface 570 may support various communication methods other than Internet communication. To this end, the communication interface 570 may be configured to include a communication module well known in the technical field of the present disclosure.

The storage 590 may store one or more computer programs 591 as non-transitory media. The storage 590 may be configured to include command memory such as read only memory (ROM), erasable programmable ROM (EPROM), electrically erasable programmable ROM (EEPROM), flash memory, a hard disk, a removable disk, or any form of computer-readable recording medium well known in the art to which the present disclosure pertains.

The computer program 591 may include one or more instructions to allow methods/operations according to various embodiments of the present disclosure to be implemented.

For example, the computer program 591 may comprises instructions for performing operations comprising: an operation for clustering a plurality of ledger information from a plurality of node devices in a blockchain network for electronic notarization, an operation for verifying forgery of the plurality of ledger information by an audit network by identifying a discrepancy between the plurality of ledger information, and an operation for generating a block for updating ledger information of the plurality of node devices on the basis of a result of verifying the forgery of the plurality of ledger information, wherein the blockchain network generates a block to be distributed in the blockchain network through a neural consensus proof-based block generation process, and the audit network comprises a plurality of audit committees having different proof methods, and verifies the forgery of the plurality of ledger information by voting on the basis of a proof result of the plurality of audit committees.

When the computer program 591 is loaded into the memory 530, the processor 510 may perform methods/operations according to various embodiments of the present disclosure by executing the one or more instructions.

The technical idea of the present disclosure described above may be implemented as computer-readable code on a computer-readable medium. The computer-readable recording medium may be, for example, a removable recording medium (CD, DVD, Blu-ray disk, USB storage device, removable hard disk), or a fixed recording medium (ROM, RAM, computer-equipped hard disk). The computer program recorded on the computer-readable recording medium may be transmitted to another computing device through a network such as the Internet and installed on the other computing device, thereby allowing it to be used in other computing devices.

Although embodiments of the present disclosure have been described above with reference to the attached drawings, those skilled in the art can appreciate that the present disclosure can be implemented in other specific forms without changing its technical idea or essential features. Therefore, the embodiments described above should be understood in all respects as illustrative and not restrictive. The scope of protection of the present disclosure should be interpreted in accordance with the claims below, and all technical ideas within the equivalent scope should be construed as being included in the scope of the technical ideas defined by the present disclosure.

What is claimed is:

1. A method for auditing for forgery by using a plurality of audit committees, the method comprising:

clustering, by an audit node of an audit network, a plurality of ledger information from a plurality of node devices in a blockchain network for electronic notarization;

verifying, by the audit node of the audit network, forgery of the plurality of ledger information by identifying a discrepancy between the plurality of ledger information; and generating, by the plurality of node devices of the blockchain network, a block for updating ledger information of the plurality of node devices on the basis of a result of the verifying forgery of the plurality of ledger information, wherein the blockchain network generates a block to be distributed in the blockchain network through a neural consensus proof-based block generation process, and the audit network comprises a plurality of audit committees having different proof methods, and verifies forgery of the plurality of ledger information by voting on the basis of a proof result of the plurality of audit committees.

2. The method of claim 1, wherein each of the different proof methods is a proof method performed on the basis of at least one of Proof of Work (PoW), Proof of Stake (PoS), Delegate Proof of Stake (DPoS), Zero-Knowledge Proofs, Practical Byzantine Fault Tolerance (PBFT), and random consensus algorithms based on neural consensus proof.

3. The method of claim 1, wherein each of the plurality of audit committees comprises a plurality of audit nodes.

4. The method of claim 1, wherein the verifying forgery of the plurality of ledger information comprises:

proving a plurality of audit ledger information corresponding to each of the plurality of audit committees; and determining audit ledger information proved by the largest number of audit ledger committees among the plurality of audit ledger information as a first audit ledger information of which integrity is proven.

5. The method of claim 4, wherein the verifying forgery of the plurality of ledger information further comprises:

updating audit ledger information of a first audit committee which has audit ledger information different from the first audit ledger information.

6. The method of claim 4, wherein the verifying forgery of the plurality of ledger information comprises:

determining that at least one of the plurality of ledger information is damaged when any ledger information among the plurality of ledger information is different from another ledger information among the plurality of ledger information.

7. The method of claim 6, wherein the verifying forgery of the plurality of ledger information comprises:

determining ledger information identical with the first audit ledger information among the plurality of ledger information as unforged ledger information, and determining ledger information not identical with the first audit ledger information among the plurality of ledger information as forged ledger information.

8. The method of claim 1, wherein the plurality of ledger information comprises an electronic notarization document, or a hash value extracted from the electronic notarization document.

9. The method of claim 1, wherein when an external data for electronic notarization is generated, the external data is provided to the blockchain network and the audit network, respectively, the blockchain network updates ledger information of the plurality of node devices with ledger information including the external data by using the neural consensus proof-based block generation process, and the audit network updates audit ledger information of the plurality of audit committees with audit ledger information including the external data by using one or more block generation processes corresponding to each of the plurality of audit committees.

10. The method of claim 1, wherein the audit network is a network separated from the blockchain network.

11. The method of claim 1, wherein the plurality of node devices perform the neural consensus proof-based block generation process according to a preset condition, and wherein the neural consensus proof-based block generation process comprises:

extracting an effective verification data from a new block data, obtaining neural consensus designation information of a next block generated on the basis of a random consensus proof process according to a verification processing of the effective verification data, selectively operating a consensus node function unit on the basis of the neural consensus designation information of the next block, and generating another effectiveness verification data of the next block.

12. The method of claim 11, wherein the effective verification data comprises consensus process verification data corresponding to the random consensus proof process, and the neural consensus designation information of the next block comprises nonce information for verifying participation qualification of neural consensus corresponding to the next block.

13. A system for auditing for forgery by using a plurality of audit committees, the system comprising:

a blockchain network for electronic notarization including a plurality of node devices performing a neural consensus proof-based block generation process according to a preset condition; and an audit network including an audit node configured to identify a discrepancy between a plurality of ledger information clustered from the plurality of node devices, verify forgery of the plurality of ledger information on the basis of a result of identifying the discrepancy, and replying with a first ledger information, whose integrity is verified, to the blockchain network, wherein the blockchain network generates, by the plurality of node devices, a block for updating ledger information of the plurality of node devices on the basis of the first ledger information, and the audit network comprises a plurality of audit committees having different proof methods and verifies forgery of the plurality of ledger information by voting on the basis of a proof result of the plurality of audit committees.

* * * * *